(12) United States Patent
Chang

(10) Patent No.: US 6,254,317 B1
(45) Date of Patent: Jul. 3, 2001

(54) TRIPLE GANTRY DRILLING SYSTEM

(75) Inventor: Frank Rong-Gan Chang, Cerritos, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/393,788

(22) Filed: Sep. 10, 1999

(51) Int. Cl.[7] .............................. B23B 35/00; B23B 39/24
(52) U.S. Cl. .............................. 408/1 R; 408/3; 408/16; 408/43; 408/46; 408/234; 409/202; 409/212
(58) Field of Search .................... 408/1 R, 3, 42, 408/43, 46, 234, 236, 237, 16; 409/201, 202, 203, 211, 212, 213, 216, 217

(56) References Cited

U.S. PATENT DOCUMENTS

| | | | |
|---|---|---|---|
| 3,559,530 | * 2/1971 | Wagner et al. | 409/202 |
| 3,730,645 | 5/1973 | Orendi | 408/46 |
| 3,867,053 | 2/1975 | Lecailtel | 408/13 |
| 4,162,134 | 7/1979 | Kitagawa | 408/46 |
| 4,937,768 | 6/1990 | Carver et al. | 364/571.01 |
| 4,976,026 | 12/1990 | Dacey, Jr. | 29/714 |
| 5,017,084 | 5/1991 | Lemelson | 414/744.3 |
| 5,088,171 | * 2/1992 | Suzuki | 408/237 |
| 5,839,323 | 11/1998 | Line | 74/490.07 |
| 5,848,458 | 12/1998 | Bullen | 29/33 K |
| 5,903,459 | 5/1999 | Greenwood et al. | 364/468.17 |
| 6,070,312 | * 6/2000 | Mantovani | 409/202 |

* cited by examiner

Primary Examiner—Steven C. Bishop
(74) Attorney, Agent, or Firm—Terry J. Anderson; Karl J. Hoch, Jr.

(57) ABSTRACT

Methods for forming fastener holes in the construction of fuselage assemblies. The method utilizes a triple gantry drilling system with upper, left and right side gantries, within which are dedicated robotic deployment arms having an automatic tool change system with drill attachment exchangeable with a plurality of tools. Each gantry is capable of translational movement along three different axis, as well as rotational movement about an axis of rotation and axis of pitch, respectively, such that simultaneous drilling about the fuselage can be achieved. The method further includes the incorporation of a vision system with camera to assist mechanics to view the drilling processes and verify structure position.

8 Claims, 2 Drawing Sheets

TRIPLE GANTRY DRILLING SYSTEM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

Military and commercial jet aircraft manufacturing techniques are well-known in the art. Crucial to such manufacture is the construction of the fuselage assembly, which is widely regarded as the most complex and costly aspect of aircraft construction, particularly in relation to the construction of large, commercial aircraft. Generally, such process includes making certain barrel and aft duct assemblies with additional substructure and installing subsystems thereonto. Ultimately, skin panels are fastened thereabout, typically by a multiplicity of rivets. With respect to the latter, it is widely recognized that such process is extremely costly and labor intensive due to the high quantity of fastener holes to be drilled in this particular section of the aircraft. In this regard, it is not uncommon for more than 1,500 fastener holes be drilled in order to attach the exterior skin components to only one side of the fuselage assembly of a single aircraft.

Additionally problematic with the construction of the fuselage assembly of such aircraft is the incorporation of interference-fit holes in a metal substructure forming the fuselage, and clearance-fit holes in the composite skin affixed thereto. In this regard, and unlike the majority of other fastener holes formed on aircraft, such bifurcated hole size system is deemed desirable insofar as weight savings can be substantially accomplished. Specifically, such two-step hole arrangement enables a lighter substructure to be utilized without compromising strength, due to the interference-fit holes, while preventing skin delamination, via the use of clearance-fit holes.

Notwithstanding the benefits of such design and resultant lightweight structure formed thereby, such assembly process has proven to be more difficult insofar as the skin components must be repeatedly removed from the structure so the clearance-fit holes formed thereon may be opened up by hand. Accurate skin location then becomes an issue as the skin is unloaded and reloaded on the assembly, making mechanization of such manufacturing process difficult to achieve.

Accordingly, there is a substantial need in the art for an assembly method, and in particular a systematic drilling method for use in the construction of fuselage assemblies that enables a multiplicity of fastener holes to be formed about the fuselage assembly in a simultaneous manner. There is an additional need in the art for such method that can simultaneously produce dissimilar-type holes, and in particular, interference-fit holes in the metal substructure of such fuselage assembly and clearance-fit holes in the composite skin to be attached thereto, continuously about such fuselage assembly in multiple planes. There is yet further a need in the art for such a method that can provide for such automated formation of fastener holes throughout a fuselage assembly that further includes quality assurance mechanisms to verify aircraft skin position and orientation relative the fuselage assembly when affixed thereto via such mechanized process.

BRIEF SUMMARY OF THE INVENTION

The present invention specifically addresses and alleviates the above-identified deficiencies in the art. In this regard, the present invention is directed to a systematic drilling method for use in forming a plurality of fastener holes upon an aircraft substructure, and in particular fuselage assemblies, along multiple axes. Such method preferably incorporates a triple gantry drilling system adapted to simultaneously affix a multiplicity of skin components to the metal substructure of a fuselage assembly during the construction thereof. According to a preferred embodiment, the gantry system utilized in such method includes upper, left and right side gantries wherein each gantry includes a robotic arm having an automatic tool changing system formed thereon. The latter preferably includes an attachment for holding a plurality of drill mechanisms exchangeable with a plurality of equipment and tools to selectively and controllably implement automated countersinking, sealing, and fastening, respectively. Preferably, such combination of such gantries will enable fastener holes to bore about five (5) dissimilar axes about both sides and upper surface of the fuselage. Specifically, each drilling system of each gantry will be capable of moving up and down along a first axis, side to side along a second axis, inwardly and outwardly relative the fuselage assembly along a third axis, rotating about a fourth axis, and rotating with a specified degree of pitch or tilt according to a fifth axis.

In a more highly preferred embodiment, there is further provided on the drill head assembly a vision system having a closed circuit television with a vision recognition system, the latter being integrated with a workstation main controller. An optical probe system is further incorporated into the drill head assembly to ensure quality control and verify aircraft skin position and orientation with respect to respective one of the gantries of such system. In this respect, such camera will assist mechanics to view the actual drilling process and verify substructure position as part of the method of the present invention.

It is therefore an object of the present invention to provide a systematic drilling method for use in the construction of fuselage assemblies that enables a multiplicity of fastener holes to be simultaneously formed thereabout.

Another object of the present invention is to provide a systematic drilling method that enables interference-fit holes to be formed within the metal substructure of a fuselage assembly while at the same time enabling clearance-fit holes to be formed in the composite skin affixed thereto.

Another object of the present invention is to provide a systematic drilling method that further provides for accurate skin placement location during the manufacture of the fuselage assembly.

Still further objects of the present invention are to provide systematic drilling methods that provide for rapid, mechanized manufacture of fuselage assemblies with greater precision, substantially less labor and sufficiently greater durability than prior art methods and manufacturing systems.

BRIEF DESCRIPTION OF THE SEVERAL VIEWS OF THE DRAWING

These, as well as other features of the present invention, will become more apparent upon reference to the drawing wherein.

DETAILED DESCRIPTION OF THE INVENTION

The detailed description as set forth below in connection with the appended drawings is intended as a description of the presently preferred embodiments of the present invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

Figure 1:
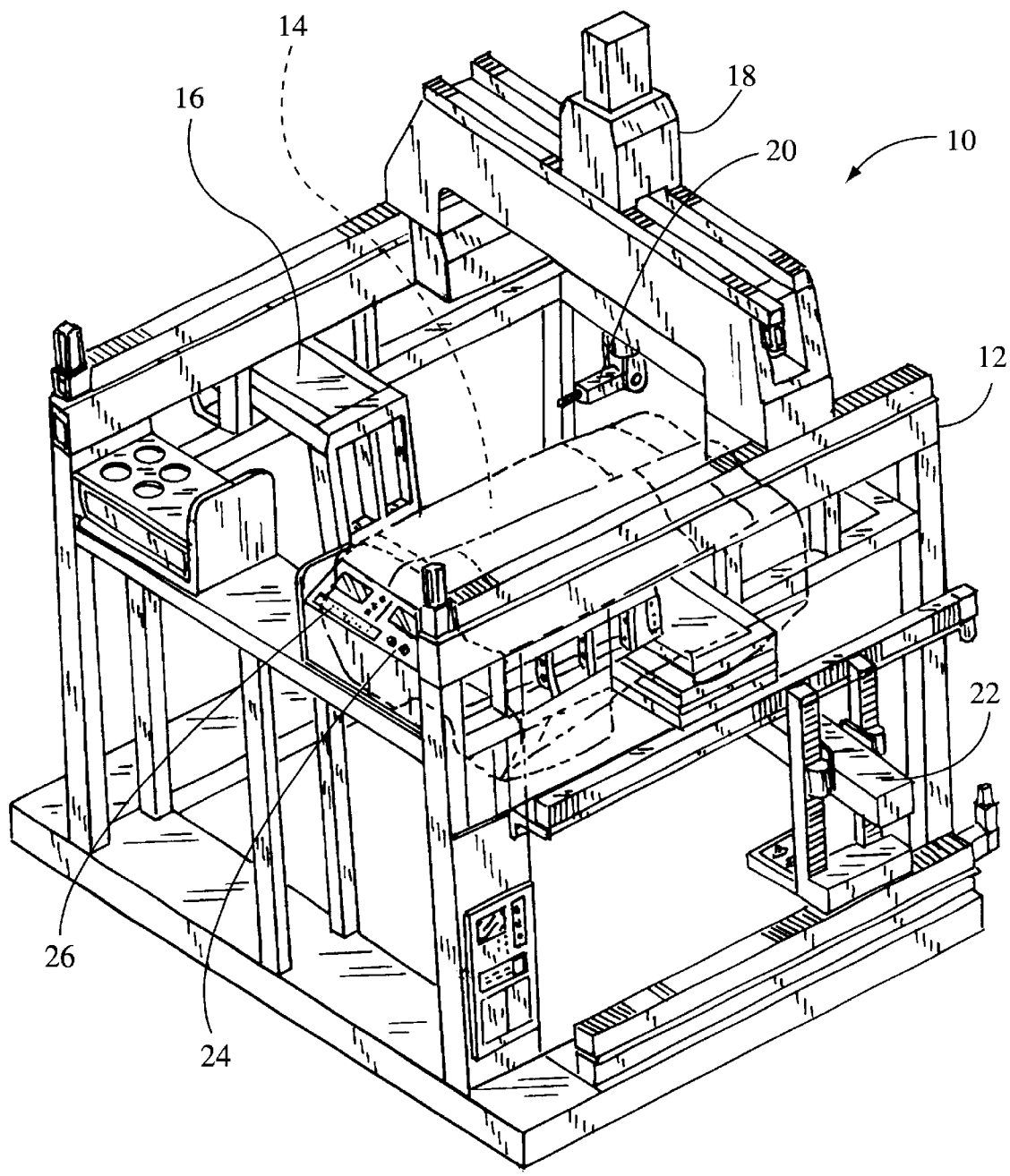
FIG. 1 is an elevated perspective view of a triple gantry drilling system for use in practicing the methods of the present invention.

Referring now to the drawings, and initially to FIG. 1, there is shown a triple-gantry drilling system 10 constructed in accordance with a preferred embodiment of the present invention. The system 10 is specifically designed and configured to facilitate the manufacture of aircraft, and in particular the fuselage assemblies of military and commercial jet aircraft. As is widely-recognized, the manufacture of fuselage assemblies is highly complex and believed to be the most costly and labor intensive aspect of jet aircraft construction. The most significant manufacturing aspect adding to such complexity and expense is the need to produce fastener holes to enable skin panels to be affixed about the barrel and aft duct assemblies of the fuselage. In this regard, and given the unique curvature and aerodynamic design of such componentry, the barrel and aft duct assemblies necessarily require that the skin panels affixed thereto be fastened via a multiplicity of rivets radially thereabout. Further, compounding the problems produced by the need for a large number of fastener holes, coupled with the arcuate contours of the fuselage assembly, is the need to form two (2) dissimilar shaped fastener holes, namely interference-fit holes and clearance-fit holes, which enables lighter substructures to be utilized in the fuselage assembly without compromising the strength or structural integrity thereto.

To address the drawbacks currently associated with jet aircraft manufacturer and in particular the construction of fuselage assemblies, there is provided herein a systematic drilling method, performed by the triple-gantry drilling system 10, that enables a multiplicity of fastener holes to be simultaneously formed radially about a fuselage assembly to thus enable a plurality of skin panels to be affixed thereto in a manner that is substantially less costly and labor intensive than prior art practices. In this regard, and as discussed more fully below, the system 10 of the present invention enables drilling methods to be deployed whereby at least three (3) fastener holes can be simultaneously formed upon a fuselage assembly (or any other aircraft component for that matter) about any top or side portion thereof regardless of curvature and orientation of the substructure or skin components to be affixed thereto.

To accomplish such methodology, the triple gantry system 10 is preferably formed as a housing 12, into which may be disposed an aircraft component, such as a fuselage assembly 14 shown in phantom. Formed upon a first side of the housing 12 is first gantry drilling system 16, the latter being operative to form fastener holes about the right side of the fuselage assembly 14 position within the housing 12.

A second, upper gantry drilling system 18, is formed on top the housing 12 and is operative to form fastener holes anywhere about the top surface of the fuselage assembly 14. In this respect, and as discussed more fully below, the upper gantry drilling system 18 is provided with a drill component 20 that is operative to move about three (3) different axes, rotate about a fourth axis at a pitch defined by a fifth axis.

On the second respective side of the housing 12 is a third gantry drilling system 22. Similar to the first and second gantry drilling systems, the third gantry drilling system 22 is operative to form fastener holes about the left side of the fuselage assembly 14. Likewise, the third gantry drilling system 22 is operative to selectively form fastener holes anywhere about such side portion of the fuselage assembly 14 insofar as such drilling system 22 is operative to position a drill (not shown) via translational and rotational movement about multiple axes.

To control the operation of each respective gantry drilling system, 16, 18, 22, there is provided a control unit or computer 24 having an operator interface 26 which enables the triple gantry drilling system 10, or any specific gantry drilling system subcomponent thereof to be operator controlled. To maximize the efficiency and cost savings, however, it is contemplated that such control unit 24 will be operative to work in an automated mode insofar as the triple gantry drilling system 10, as well as any respective gantry drilling system thereof may be deployed according to a computer program or algorithm specific to the manufacturer of a particular aircraft substructure or assembly.

To that end, it is contemplated that although shown as a housing 12, the triple gantry drilling system 10 may be formed as an integrated part of an assembly line whereby a given substructure or fuselage assembly is allowed to become selectively positioned thereinto, via a conveyor belt or the like, and caused to remain in stationary position for a limited time until each respective one of the first, second, and third gantry drilling systems forms the necessary fastener holes thereabout. As will be appreciative of those skilled in the art, by causing the fastener holes to be formed about such substructure assembly advantageously eliminates the need to continuously position and reposition a given aircraft component from work station to work station, where fastener holes are typically formed as per conventional manufacturing practices. Such practices are well-known to necessitate the use of heavy machinery at substantial cost.

Figure 2:
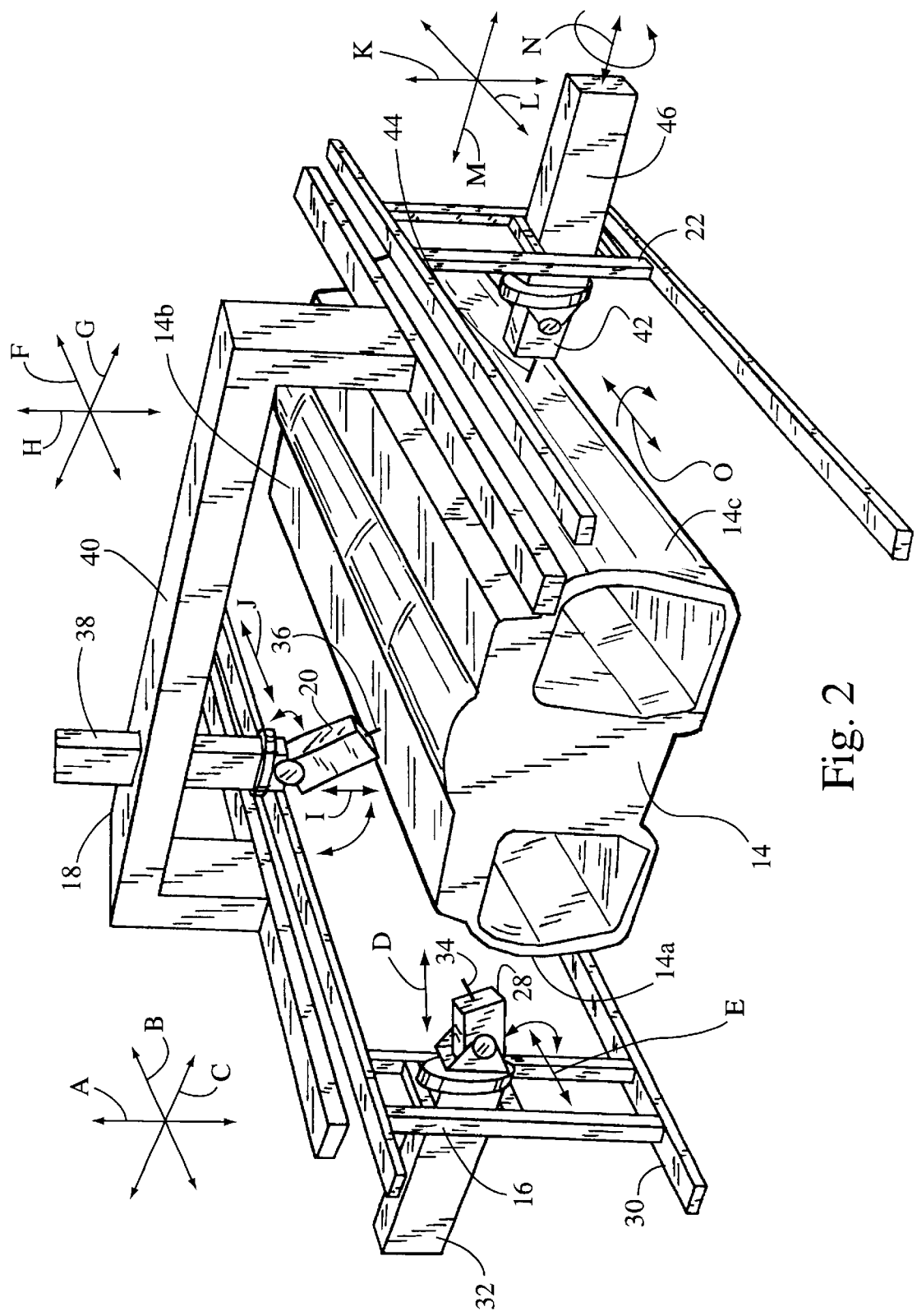
FIG. 2 is a front perspective view of the respective drilling gantries of the triple-gantry drilling system depicted in FIG. 1.

Referring now to FIG. 2, there is perspectively illustrated the first 16, second 18, and third 22 gantry drilling systems as utilized in the practice of the drilling methods of the present invention. As illustrated, the first or right gantry drilling system 16 is positioned to deploy a drill 28 and more particularly the bit 34 thereof anywhere about the right-hand side 14a of the fuselage assembly 14. To achieve that end, the first gantry drilling system 16 is mounted upon a mobile platform 30 that enables the drill 28 to thus be moved linearly about any one of three (3) axes. Specifically, such drill 28 may be caused to move up and down about a first axis A; side to side about a second axis B; and inwardly and outwardly about a third axis C.

To enable the drill and bit 28, 34 to adapt to the curvature of the outer surface of the fuselage assembly 14, the drill and bit 28, 34 are rotatably mounted upon a deployment arm 32 such that the drill and bit 28, 34 may be selectively and controllably rotated about a fourth axis D. In addition to rotating about a fourth axis D, the drill and bit 28, 34 are further rotatably mounted about at the distal-most end of the deployment arm 32 to thus enable the drill and bit attached thereto to attain a desired pitch or tilt via a second rotational movement about a fifth axis E.

Similarly, the second upper gantry drilling system 18 includes a drill 20 with bit 36 extending therefrom which may be selectively deployed to form fastener holes anywhere about the upper surface 14b of the fuselage assembly 14. Preferably, the drill and bit 20, 36 are mounted upon the distal-most end of a deployment arm 38, the latter being mounted upon a cross beam 40 capable of moving along axis F to thus deploy the drill and bit at a point anywhere between the front and back of the upper surface 14b of fuselage assembly 14. The deployment arm 38 is operational to move along the cross beam 40 to move from side to side via axis G, and up and down along axis H to thus position the drill and bit 20, 36 at a desired width and depth, respectively. The drill and bit 20, 36 are rotatively mounted upon the distal-most end of the deployment arm 38, such that the same may rotate about axis I, and further may be caused to drill into the fuselage assembly at the desired orientation by selectively rotating the drill and bit to have a desired pitch by rotating the same about axis J.

As per the first gantry drilling system 16, the third gantry drilling system 22 is operative to form fastener holes about the left side 14c of the fuselage assembly 14. As per the other gantry drilling systems, the left gantry drilling system is operative to move up and down, side to side, and inwardly and outwardly along axes K, L, and M, respectively, via deployment arm 46. The drill and bit 42, 44 are further operative to rotate about the distal-most end of the deployment arm 46 of the third gantry drilling system 22, via axis N. The drill and bit may further be caused to tilt to a desired pitch via rotational movement about axis O.

As will be recognized by those skilled in the art, the actuation of each of the aforementioned gantry drilling systems 16, 18, 22 may be automated and controlled via computer (not shown). Adventitiously, by providing such drilling system and method capable of simultaneously forming such fastener holes at specified sites and specified depths at specified orientations, the drilling methods of the present invention can facilitate fuselage assembly manufacture far more effectively than prior art methods utilizing manual labor and visual estimation for fastener hole formation.

Provided herebelow as an example, and not for purposes of limiting the scope of the methods of the present invention, is the maximum operational travel for each of the drills of each of the first, second, and third gantry systems for use in the automated manufacture of F-18 military aircraft.

GANTRY SYSTEMS

1. First or Right Gantry System
   Axis A=96 Inches
   Axis B=192 Inches
   Axis C=48 Inches
   Axis D=±180°
   Axis E=±100°
2. Second or Upper Gantry System
   Axis G=192 Inches
   Axis H=144 Inches
   Axis I=60 Inches
   Axis J=±180°
   Axis K=±180°
3. Third or Left Gantry System
   Axis L=96 Inches
   Axis M=192 Inches
   Axis N=48 Inches
   Axis O=±180°
   Axis P=±100°

As it will be recognized by those skilled in the art, the first, second, and third gantry drilling systems 16, 18, 22 incorporated in the practice of the present invention may be readily constructed utilizing conventional robotic technology and existing computer software and computer applications deployed in the art for automated manufacturing processes. Along these lines, it will be recognized by those skilled in the art that each of the gantry systems incorporated in the practice of the methods of the present invention shall include servo motor capability, motion control, feed-back devices, power-train components, cable covers, limit switch interface hardware and other necessary features.

Similarly, the drills and bits utilized in the practice of the present invention may be conventional in nature as per like devices utilized in the prior art for forming fastener holes on aircraft. Along these lines, it is currently contemplated that the drill shall be operative to rotate up to 5,000 RPM continuous spindle speed, infinitely variable. Static and dynamic balance will further be required for the full range of specified speeds. Moreover, it is contemplated that each of the drill heads in the assembly should provide a drill quilling stroke of six (6) inches at 500 IPM feed rate, likewise being infinitely variable.

To further expand upon the drilling capabilities of the methods of the present invention, and in particular to form holes of dissimilar size, it is contemplated that the methods will incorporate an automatic tool changing system. Specifically, such tool changing system, which is similar to those known in the art, will comprise a pneumatically, mechanically, or electrically controlled system for securable and releasably holding the taper or collect chuck. Preferably, such automatic tool changing system will have a tool holding capability and further be provided with a dedicated computer to enable the same to interface and communicate with other workstation computers. Further preferable features include tool retention mechanisms to ensure that tools are not accidentally released in the event of a loss of power, which likewise will include manual tool extractor capabilities to assist manual insertion extraction of tools into or from the drill mounts formed upon the respective gantries.

To provide means for ensuring proper orientation and deployment of the drill bits utilized in the practice of the methods of present invention, it is further contemplated that each of the five axes of each respective gantry of the gantry system shall be equipped with a two-dimensional closed circuit vision system, mounted to the respective drill head assembly thereof. Such vision system preferably should consist of a closed circuit television and a vision recognition system, with the hardware and software or operation of the vision system to be integrated and operated in a workstation main controller, identified as 24 in FIG. 1.

The methods of the present invention further include verifying aircraft skin position and orientation with respect to each of the five (5) axes of each of the respective gantry drilling systems. Preferably, a Renishaw optical probe system would be deployed to ensure the integration and transformation between the aircraft skin hole data set and the machine's access coordinates within the defined work envelope prior to the formation of the fastener holes on the skins. As will be recognized by those skilled in the art, the Renishaw probe will be positioned to touch specific points on the skin. The data set of such points, via the probe's output, will be utilized to calibrate the reference frame of the triple gantry system. It is further contemplated that a probe will be able to be manually locked into the drill head assembly of each respective gantry by utilizing ISO 30 taper chuck and shall further have an interface circuit to process signals through the workstation main controller.

Although the invention has been described herein with specific reference to a presently preferred embodiment thereof, it will be appreciated by those skilled in the art that various modifications, deletions, and alterations may be made to such preferred embodiment without departing from the spirit and scope of the invention. Accordingly, it is intended that all reasonably foreseeable additions, modifications, deletions and alterations be included within the scope of the invention as defined in the following claims.

What is claimed is:

1. A method of forming a plurality of fastener holes within a work piece having right and left sides and an upper side comprising:

a) providing a first gantry drilling system having a first deployment arm with a first drill with a first drill bit mounted thereon, said first deployment arm being operative to move relative said right side of said work piece vertically about a first axis, side to side along a second axis and inwardly and outwardly along a third axis, said first drill with said first drill bit being further mounted upon said deployment arm such that said first drill with said first drill bit may rotate about a fourth axis and pivot about a fifth axis upon the distal of said first deployment arm;

b) providing a second gantry drilling system having a second deployment arm with a second drill with a second drill bit mounted thereon, said second deployment arm being operative to move relative said upper surface of said work piece vertically about a first axis, side to side along a second axis and inwardly and outwardly along a third axis, said second drill with said second drill bit being further mounted upon said second deployment arm such that said second drill with said second drill bit may rotate about a fourth axis and pivot about a fifth axis upon the distal end of said second deployment arm;

c) providing a third gantry drilling system having a third drill with a third drill bit mounted thereon, said third deployment arm being operative to move relative said left side of said work piece vertically about a first axis, side to side along a second axis and inwardly and outwardly along a third axis, said third drill with said third drill bit being further mounted upon said third deployment arm such that said third drill with said third drill bit may rotate about a fourth axis and pivot about a fifth axis upon the distal end of said third deployment arm;

d) simultaneously deploying said first, second, and third gantry drilling systems such that each respective drill of each respective gantry system simultaneously produces fastener holes at select locations radially about the right, upper, and left surfaces of said work piece; and e) repeating step d.

2. The method of claim 1 wherein in step d, each respective drill of each respective gantry drilling system and the respective fastener holes formed thereby is controlled by computer.

3. The method of claim 1 further comprising the step:

f) periodically changing each respective drill bit of each drill of said first, second, and third gantry drilling systems.

4. The method of claim 1 further comprising the step:

g) visually monitoring the formation of each respective faster hole formed by said drills of said first, second, and third gantry drilling, systems.

5. The method of claim 4 wherein step g, said visual monitoring is realized via dedicated optical probes incorporated into dedicated drill head assemblies of said drills of said first, second, and third gantry drilling systems.

6. The method of claim 1 wherein said work piece comprises an aircraft component.

7. The method of claim 6 wherein said aircraft component comprises a fuselage assembly.

8. The method of claim 1 wherein:

in step a, said first deployment arm is operative to move about said first axis a distance of approximately 96 inches, move about said second axis a distance of approximately 192 inches, move about said third axis a distance of approximately 48 inches, rotate about said fourth axis 360°, and tilt about said fifth axis approximately 200°;

in step b, said deployment arm is operative to move about said first axis a distance of 60 inches, move about said second axis 192 inches, move about said third axis a distance of 144 inches, rotate about said fourth axis of 360°, and tilt about said fifth axis 200°; and in step c, said deployment arm is operative to move about said first axis a distance of 96 inches, move about said second axis a distance of 192 inches, move about said third axis a distance of 48 inches, rotate about said fourth axis of 360°, and tilt about said fifth axis 200°.

* * * * *